US010055297B1

(12) United States Patent
Biton et al.

(10) Patent No.: US 10,055,297 B1
(45) Date of Patent: Aug. 21, 2018

(54) SYSTEM, METHOD, AND COMPUTER PROGRAM FOR SMART DATABASE INFLATION

(71) Applicant: Amdocs Software Systems Limited, Dublin 3 (IE)

(72) Inventors: Eliezer Biton, Pardesia (IL); Avner Fregi Cohen, Elad (IL); Roi Shecwitz, Kibutz Mishmarot (IL)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 321 days.

(21) Appl. No.: 14/832,814

(22) Filed: Aug. 21, 2015

(51) Int. Cl.
*G06F 17/30* (2006.01)
*G06F 11/14* (2006.01)
*G06F 11/20* (2006.01)

(52) U.S. Cl.
CPC ...... *G06F 11/1435* (2013.01); *G06F 11/1451* (2013.01); *G06F 11/2058* (2013.01); *G06F 11/2069* (2013.01); *G06F 2201/80* (2013.01); *G06F 2201/84* (2013.01)

(58) Field of Classification Search
CPC .......... G06F 11/1435; G06F 11/2058; G06F 11/1451; G06F 11/2069; G06F 2201/84; G06F 2201/80
See application file for complete search history.

(56) References Cited

U.S. PATENT DOCUMENTS

| 5,537,590 | A | 7/1996 | Amado |
| 8,495,008 | B2 | 7/2013 | Ewing et al. |
| 8,930,275 | B2 | 1/2015 | Heizmann et al. |
| 2006/0010227 | A1* | 1/2006 | Atluri ................. G06F 11/1453 709/217 |

(Continued)

*Primary Examiner* — Greta L Robinson
(74) *Attorney, Agent, or Firm* — Zilka-Kotab, P.C.

(57) ABSTRACT

A system, method, and computer program product are provided for smart database inflation. In use, a trigger signal to begin capturing information associated with database activities corresponding to one or more operational systems is detected. The trigger signal is triggered by a specific business flow or transaction in the one or more operational systems. In response to detecting the trigger signal, the information associated with the database activities corresponding to the one or more operational systems is captured for a duration of an event associated with the trigger signal. The information associated with the database activities includes valid operational data and one or more affected records associated with the one or more operational systems. Additionally, the information associated with the database activities corresponding to the one or more operational systems is duplicated in at least one mirroring table. Further, the information associated with the database activities corresponding to the one or more operational systems is processed to determine a nature of the information, a correlation of attributes associated with the information, and a configuration of inflation rules and inflation strategy. Moreover, the information associated with the database activities is processed to inflate one or more databases utilizing the information associated with the database activities in accordance with the inflation rules and inflation strategy.

18 Claims, 8 Drawing Sheets

(56) References Cited

U.S. PATENT DOCUMENTS

| | | | |
|---|---|---|---|
| 2008/0133856 A1* | 6/2008 | Ontko | G06F 11/2069 |
| | | | 711/162 |
| 2010/0175052 A1 | 7/2010 | Prasad et al. | |
| 2010/0211825 A1 | 8/2010 | Haham et al. | |
| 2011/0276579 A1* | 11/2011 | Colrain | G06F 17/30557 |
| | | | 707/756 |
| 2013/0042145 A1 | 2/2013 | Pasupuleti et al. | |
| 2014/0006459 A1 | 1/2014 | Guo et al. | |
| 2014/0067814 A1* | 3/2014 | Palmert | G06F 17/30598 |
| | | | 707/738 |
| 2015/0039591 A1 | 2/2015 | Ding et al. | |

* cited by examiner

SYSTEM, METHOD, AND COMPUTER PROGRAM FOR SMART DATABASE INFLATION

FIELD OF THE INVENTION

The present invention relates to database inflation, and more particularly to inflating databases efficiently.

BACKGROUND

When delivering software that accomplishes mission critical, high availability, high demand services at a large scale such as in the telecommunications industry, it is a must to ensure the products' best quality before the products are delivered to the customers. It is therefore essential to perform a large number of tests, including non-functional (load) testing on environments that are as realistic as possible by using inflated databases that will be as similar to real productions as possible, from both volume and data consistency aspects.

Additionally, the databases need to be configured in a way that is consistent with any business flows of the global system. The databases must also be provisioned with data, as if the data in the databases is a result from exact operations of the system.

The configuration and provisioning process of the database is called inflation. Inflating databases induces two major challenges, specifically, the need to have the most realistic data and to be able to inflate the databases in the minimum time possible.

Most of the current database inflation techniques deal with synthetic data or, in other cases, use automation that records the application user interface and replays the recording. Both techniques have drawbacks, as it is time and resource consuming to implement and replay actions, especially when products are at early development stages and are not stable enough.

There is thus a need for addressing these and/or other issues associated with the prior art.

SUMMARY

A system, method, and computer program product are provided for smart database inflation. In use, a trigger signal to begin capturing information associated with database activities corresponding to one or more operational systems is detected. The trigger signal is triggered by a specific business flow or transaction in the one or more operational systems. In response to detecting the trigger signal, the information associated with the database activities corresponding to the one or more operational systems is captured for a duration of an event associated with the trigger signal. The information associated with the database activities includes valid operational data and one or more affected records associated with the one or more operational systems. Additionally, the information associated with the database activities corresponding to the one or more operational systems is duplicated in at least one mirroring table. Further, the information associated with the database activities corresponding to the one or more operational systems is processed to determine a nature of the information, a correlation of attributes associated with the information, and a configuration of inflation rules and inflation strategy. Moreover, the information associated with the database activities is processed to inflate one or more databases utilizing the information associated with the database activities in accordance with the inflation rules and inflation strategy.

DETAILED DESCRIPTION

Figure 1:
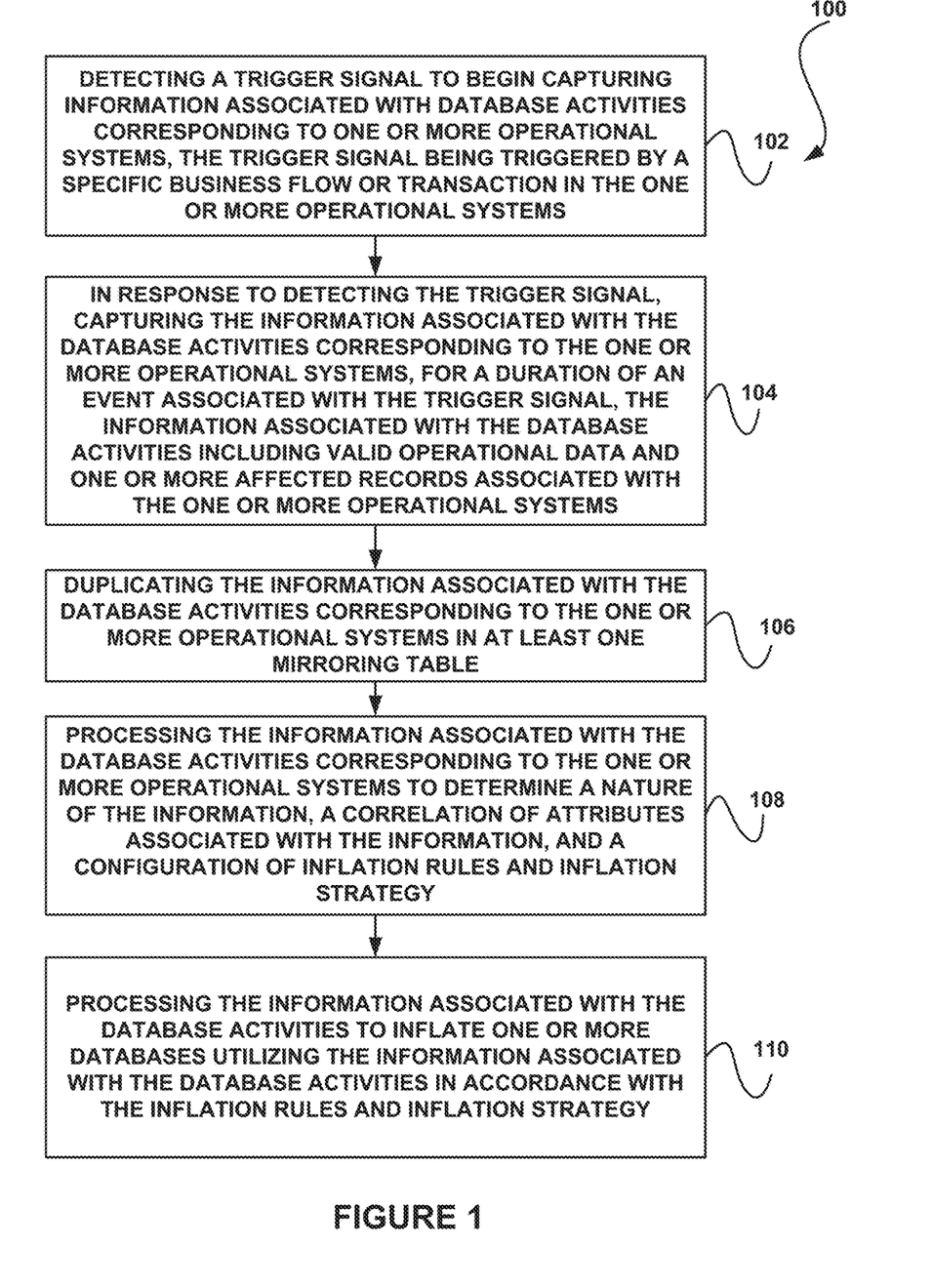
FIG. 1 illustrates a method for smart database inflation, in accordance with one embodiment.

FIG. 1 illustrates a method 100 for smart database inflation, in accordance with one embodiment. In the context of the present description, database inflation refers to any configuration and provisioning process associated with one or more databases.

As shown in FIG. 1, a trigger signal to begin capturing information associated with database activities corresponding to one or more operational systems is detected. See operation 102. The trigger signal is triggered by a specific business flow or transaction in the one or more operational systems.

In various embodiments, the trigger signal may include a user initiated trigger signal or an automatically initiated trigger signal (e.g. based on an action associated with the business flow, etc.). The business flow may include any actions taken by a user (e.g. utilizing one or more user interfaces, software applications, etc.) or a system. The transaction may include any transaction associated with purchasing or billing, etc. Thus, the database activities may include activities associated with an application flow corresponding to one or more software applications, and/or activities associated with various systems, etc.

In response to detecting the trigger signal, the information associated with the database activities corresponding to the one or more operational systems is captured for a duration of an event associated with the trigger signal. See operation 104. The information associated with the database activities includes valid operational data and one or more affected records associated with the one or more operational systems.

The event associated with the trigger signal may include any event or series of events. For example, the event may include the utilization of an application, user interface, and/or system, etc.

In one embodiment, capturing the information associated with the database activities for the duration of the event may include capturing the information associated with the database activities for a plurality of iterations of an application flow. In this case, the plurality of iterations of the application flow may include at least a minimum number of recommended iterations to perform the application flow.

Moreover, the trigger signal may be engaged for the duration of the event or the series of events, which may include multiple iterations of an activity series, etc. In one embodiment, the information associated with the database activities corresponding to the one or more operational systems may be captured until the trigger signal is disabled. In another embodiment, the information associated with the database activities corresponding to the one or more operational systems may be captured until an 'off' signal is received.

Additionally, the information associated with the database activities corresponding to the one or more operational systems is duplicated in at least one mirroring table. See operation 106. A mirroring table refers to any table that is used to organize the captured information.

Further, the information associated with the database activities corresponding to the one or more operational systems is processed to determine a nature of the information, a correlation of attributes associated with the information, and a configuration of inflation rules and inflation strategy. See operation 108. The nature of the information may include an indication of any characteristics of the information, such as the type of the information or the size of the information, etc.

The inflation rules may include any rules associated with inflating databases, such as rules associated with the tables to populate, and the format of the data, etc. The inflation strategy may include any instructions or strategy associated with inflating the databases and/or applying the inflation rules.

For example, the inflation strategy may include a plurality of routines for programming instructions associated with inflating the databases. In this case, the plurality of routines may include instructions for inflating a plurality of tables associated with a tables list. As examples, the plurality of routines may include instructions corresponding to a thread amount for simultaneous execution for each of the tables associated with the tables list, a number of logical records to insert for each of the tables associated with the tables list, and/or a field inflation instruction for each of the tables associated with the tables list, etc.

Further, in one embodiment, determining the configuration of inflation rules and the inflation strategy may include setting an inflation strategy for each column in a table affected by the database activities corresponding to the operational systems. In some embodiments, the inflation rules may be converted to one or more XML files (and/or various other types of files) to be utilized for inflating the one or more databases.

The processing of the information associated with the database activities may occur automatically in response to a termination of the trigger signal. Moreover, the processing of the information associated with the databases may include a variety of activities, which may include manual and/or automatic steps. For example, the processing of the information associated with the database activities may include a manual step of reviewing one or more of the correlation of the attributes associated with the information, or the configuration of inflation rules and inflation strategy.

As another example, the processing of the information associated with the database activities may include a manual step allowing a user to add additional information associated with one or more of the correlation of the attributes associated with the information, or the configuration of inflation rules and inflation strategy. As another example, the processing of the information associated with the database activities may include a manual step allowing a user to overwrite data associated with one or more of the correlation of the attributes associated with the information, or the configuration of inflation rules and inflation strategy.

Moreover, the information associated with the database activities is processed to inflate one or more databases utilizing the information associated with the database activities in accordance with the inflation rules and inflation strategy. See operation 110.

It should be noted that, in one embodiment, the method 100 may include configuring the mirroring table(s) and/or the database(s) prior to capturing the information associated with the database activities.

In various embodiments, the operations of method 100 may be implemented utilizing various hardware and/or software, such as one or more processors implementing various logic, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
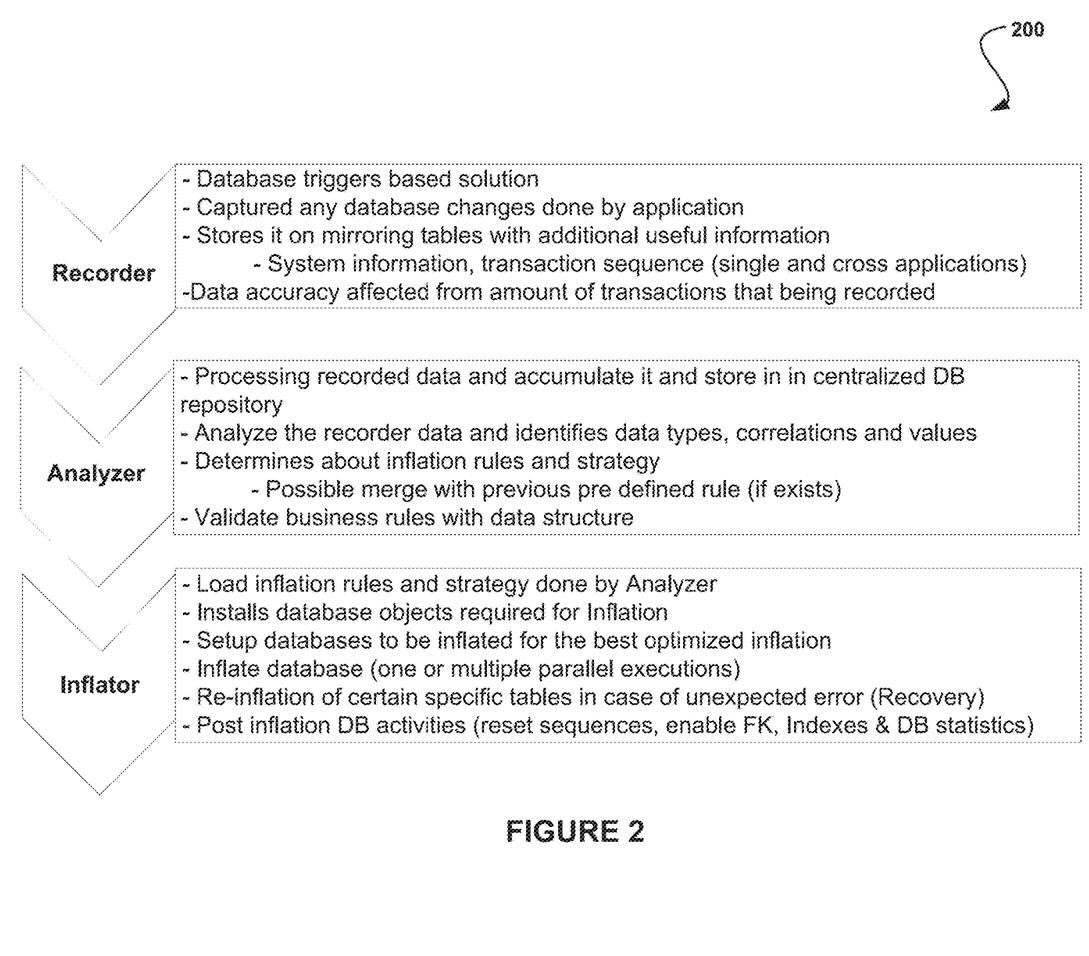
FIG. 2 illustrates a high level overview of system components for performing smart database inflation, in accordance with one embodiment.

FIG. 2 illustrates a high level overview 200 of system components for performing smart database inflation, in accordance with one embodiment. As an option, the overview 200 may be viewed in the context of the details of the previous figure(s). Of course, however, the overview 200 may be viewed in the context of any desired environment. Further, the aforementioned definitions may equally apply to the description below.

When delivering software that accomplishes mission critical, high availability, high demand services at a large scale such as in the telecommunications industry, it is a must to ensure the products' best quality before they are delivered to the customers. It is therefore essential to perform a large number of tests, including, non-functional (load) testing on environments that are as realistic as possible by using inflated databases that will be as similar to real productions as possible, from both volume and data consistency aspects.

Additionally, the databases need to be configured in a way that is consistent with any business flows of the global system. The databases must also be provisioned with data, as they were resulting from exact operations of the system.

The configuration and provisioning process of the database is called inflation. Inflating databases induces two major challenges, specifically, the need to have the most realistic data and to be able to inflate it on minimum time as possible.

Most of the current database inflation techniques deal with synthetic data or, in other cases, use automation that records the application user interface and replays it. Both techniques have drawbacks, as it is time and resource consuming to implement and replay actions, especially when products are at early development stages and are not stable enough.

The techniques and systems described herein overcome these problems (among others) by capturing all database related activities triggered by a specific business flow or transaction in a system, analyze the captured activities, and replay the activities with the required volumes and within a very short time resolution.

Effective and efficient software testing is vital to the software development lifecycle, especially for those with the majority of database applications. Testing of database applications with large scale data is highly important in the development phase in order to perform early detection of problems that might result from the size of the database and impact database application efficiency.

The smart database inflation system and techniques described herein are a database triggers based solution that sits on an application lower level (database) in a transparent way and tracks business flows, translates the business flows to a database executions sequence, and inflates them in mass volumes.

As shown in FIG. 2, the smart database inflation system may include three modules: a recorder component, an analyzer component, and an inflator (player) component, which may all be implemented utilizing various systems and/or processors, etc.

The recorder module is a database trigger based solution that captures any changes that are done on a table level and duplicates the affected records into mirroring tables, along with the sessions, order of execution, and additional useful information required for analysis processing. The triggers may be activated just before running the required recording scenario and the triggers may be disabled at the end of the recording process. In one embodiment, running the scenario at least N times (e.g. where N is a positive integer, e.g., 3 times, etc.) will create the most optimized data set for analyzer.

The analyzer module processes the data set captured by the recorder and determines the nature of the data, correlation of attributes, and additional analysis that will set the inflation rules and strategy. The analyzer may execute a set of routines that is provided by a human operator. These routines may be specified in a specific language that contains the fundamental instructions (data generator) such as, for example: CONSTANT (no data manipulation is required—populate as is); FLOW_SEQUENCE (specific function [e.g. Java or Oracle] to be incremented only for new entity); DATE_CONSTANT (pre-defined format, using Oracle date function); JAVA_FUNCTION (parse and execute on Java code [can be very complex including data manipulation or database references]); ORA_FUNCTION (parse and execute it in Oracle, as is); MULTI_SEQUENCE (few sequences that are the sources for a single field, with ratio/order); LIST_VALUE (take value from pre-defined list [can be csv or database query], with selection ratio (%) from each value); and/or EMBEDED_TEXT (function/reference inside constant text [embedded]).

The inflator is a set of processes that inflate the database(s) with the required high volumes of data, based on the inflation rules and strategy. The inflator executes a set of routines (the strategy), which includes programming of fundamental instructions, such as, for example, a tables list, and database connections. The tables list includes a list of tables to inflate. For each table, this may include: number of threads (threads amount for simultaneous execution); number of records (number of logical records to insert); volume factor (records factor for each logical record); batch size [BULK processing size in database (=commit size)]; operation type [new (insert), update and delete]; Sql template (according to the operation type); and table fields strategy.

With respect to table fields strategy, for each field there may be an inflation instruction (data generator rule) defined by the analyzer, and additional related instructions such as: minimum and maximum values; date format, date ranges (from, to); regular expressions; strings pools/generators; and Java functions (as Groovy). With respect to database connections, there can be one or more databases.

Figure 3:
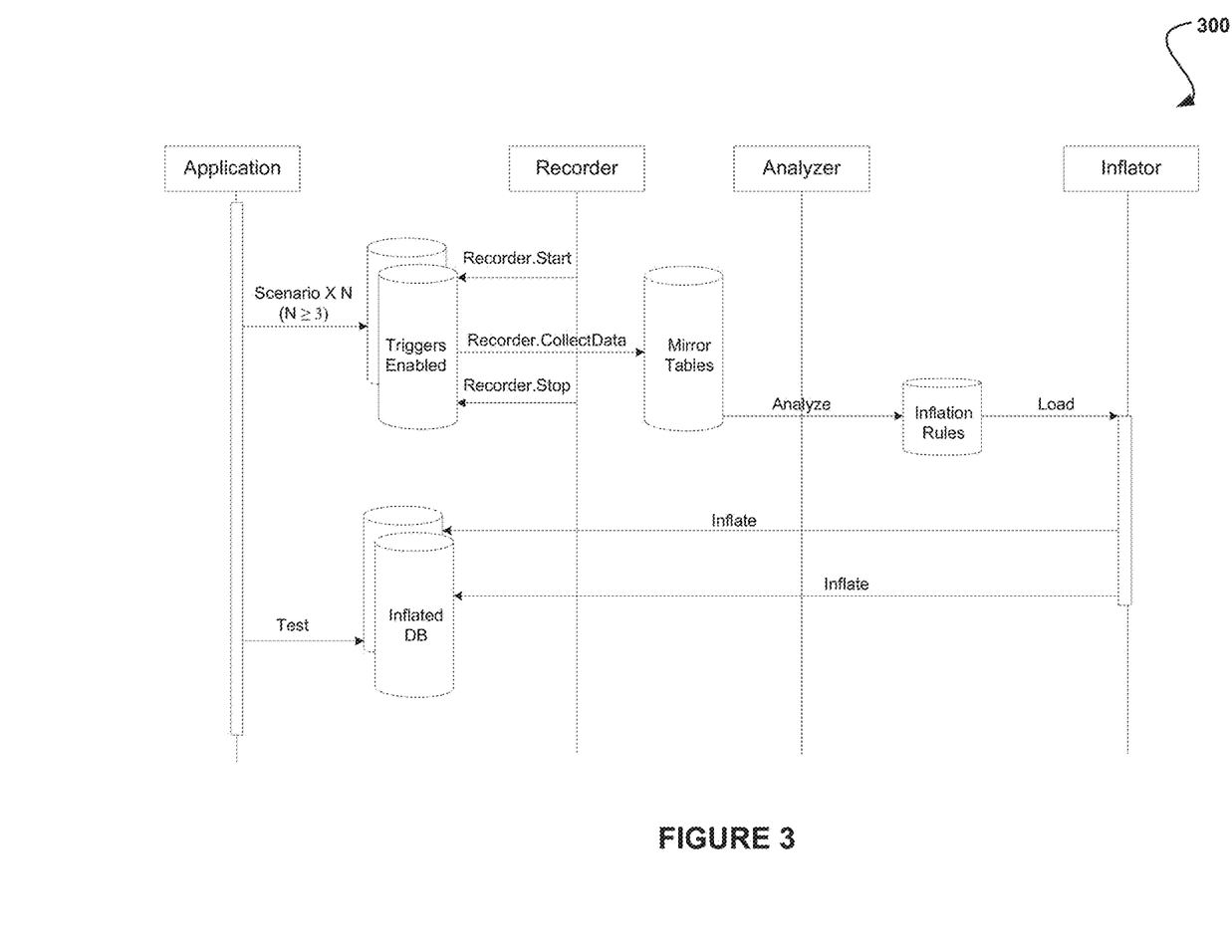
FIG. 3 illustrates a system flow diagram for performing smart database inflation, in accordance with one embodiment.

FIG. 3 illustrates a system flow diagram 300 for performing smart database inflation, in accordance with one embodiment. As an option, the diagram 300 may be viewed in the context of the details of the previous figure(s). Of course, however, the diagram 300 may be viewed in the context of any desired environment. Further, the aforementioned definitions may equally apply to the description below.

With reference to FIG. 3, the first step is to perform the recorder setup for setting the database triggers and mirroring tables. Once this is done, the recorder is ready to capture any desired application flow (e.g. and must be performed a minimum number of iterations, in one embodiment). Once this stage is completed, the database triggers are disabled in order to stop the recording process.

The analyzer processes all recorded data, determines the nature of the data, and sets the inflation strategy for each column of the affected tables. This may be processed automatically, however, in one embodiment, an additional manual step may be required to review the analyzed data, to add the supplementary parts which may not be covered by the automated analysis (and also to overwrite the automated analysis when required).

The inflator loads the inflation rules, converts them into XML files (and/or generates XML files based on the rules), which will be used for the database inflation. This inflator also receives runtime instructions such as number of threads, destination databases, number of records to inflate, and bulk size, etc.

Prior to the actual database inflation, the inflator installs database objects required for the inflation, disables existing foreign keys, triggers, and non-unique indexes in order to gain the most optimized conditions for inflating the database in the most efficient way. The inflator process is also fail safe and enables re-inflation of certain specific tables the inflator failed to inflate due to unexpected errors and without the need to restart the entire process again.

Once the databases are inflated, post inflation activity is performed in order to synchronize application database sequences, rebuild all database indexes and calculate database statistics.

The smart database inflation does not require a fully functioning system as it can start recording on implemented systems with a partial feature set, and does not depend on any user interface being available in any specifics language, which makes it also very suitable for early development stages.

The smart database inflation is a very efficient way to inflate databases as it is dealing with the lower data layer (no complex calculations or logic like real applications) and it stretches productivity to the databases boundaries.

The smart database inflation is efficient and deterministic and it also eliminates the needs of performing database backup once the inflation process is completed, as it can quickly be replayed (if needed) on much faster time than restoring from backups, and also removes any backup handling and storage.

The smart database inflation techniques described here may be used for additional purposes beyond testing. For example, such techniques provide a very convenient way to calculate database sizing per business flow and thus provide accurate database sizing information to implementing teams. Also, such techniques allow, from the analyzing part of the database impact of a given business flow, to track the exact order of database transactions, verify its efficiency and help detect bottlenecks and cycles to improve the business flow implementation and the impact of new features on previously implemented business flows.

Figure 4:
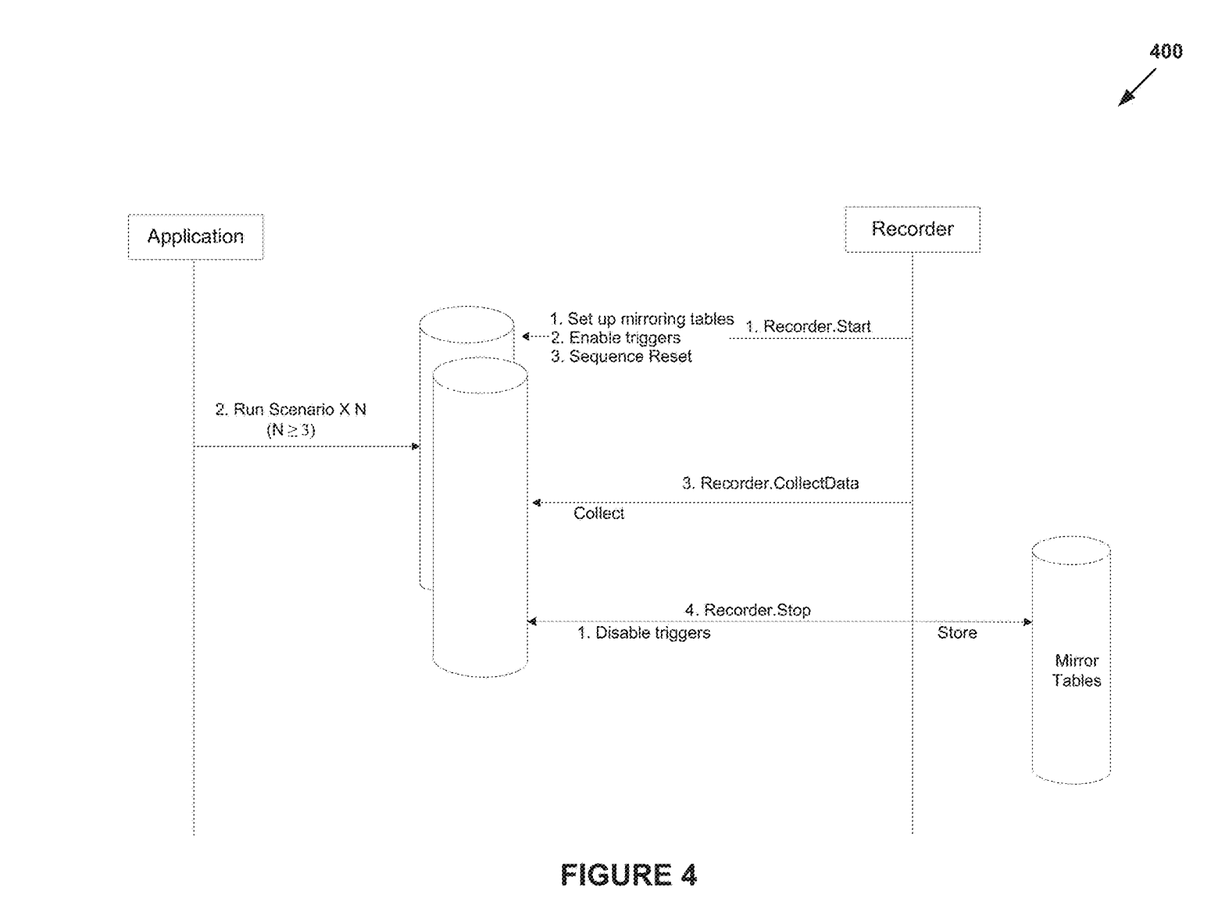
FIG. 4 illustrates a system flow diagram of a recorder component for performing smart database inflation, in accordance with one embodiment.

FIG. 4 illustrates a system flow diagram 400 of a recorder component for performing smart database inflation, in accordance with one embodiment. As an option, the diagram 400 may be viewed in the context of the details of the previous figure(s). Of course, however, the diagram 400 may be viewed in the context of any desired environment. Further, the aforementioned definitions may equally apply to the description below.

In operation, the recorder component begins recording (see step 1). As part of the recording initialization (or prior to the recording), mirroring tables are setup and triggers are enabled.

A test scenario associated with an operational application/system is then executed while the recorder is recording (see step 2). The data recorded during the test is then collected and stored in the mirroring tables (see step 3). Once the test scenario has been executed, the recorder stops recording and the triggers are disabled (See step 4).

Figure 5:
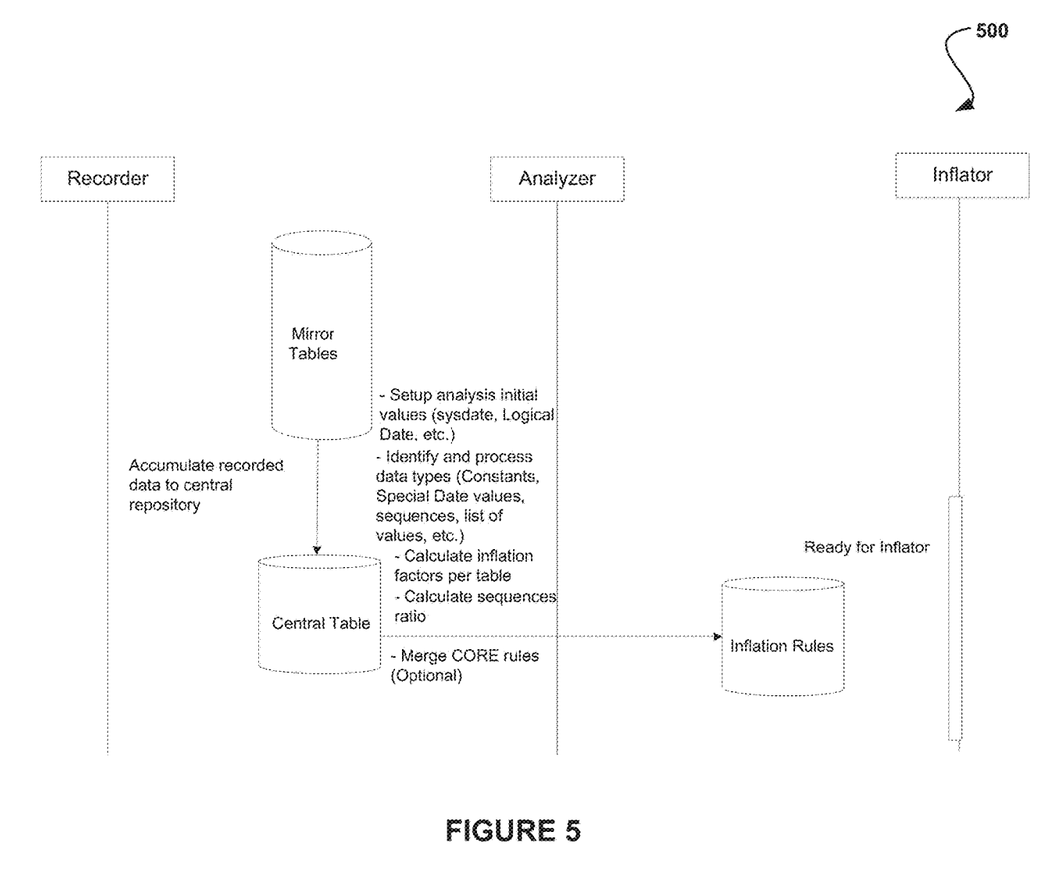
FIG. 5 illustrates a system flow diagram of an analyzer component for performing smart database inflation, in accordance with one embodiment.

FIG. 5 illustrates a system flow diagram 500 of an analyzer component for performing smart database inflation, in accordance with one embodiment. As an option, the diagram 500 may be viewed in the context of the details of the previous figure(s). Of course, however, the diagram 500 may be viewed in the context of any desired environment. Further, the aforementioned definitions may equally apply to the description below.

In operation, the analyzer component set-ups analysis initial values (e.g. system date, logical date, etc.), identifies and processes data types (e.g. constants, special date values, sequences, list of values, etc.), calculates inflation factors per table, and calculates sequences ratios.

Further, the analyzer accumulates the recorded data to a central repository.

Figure 6:
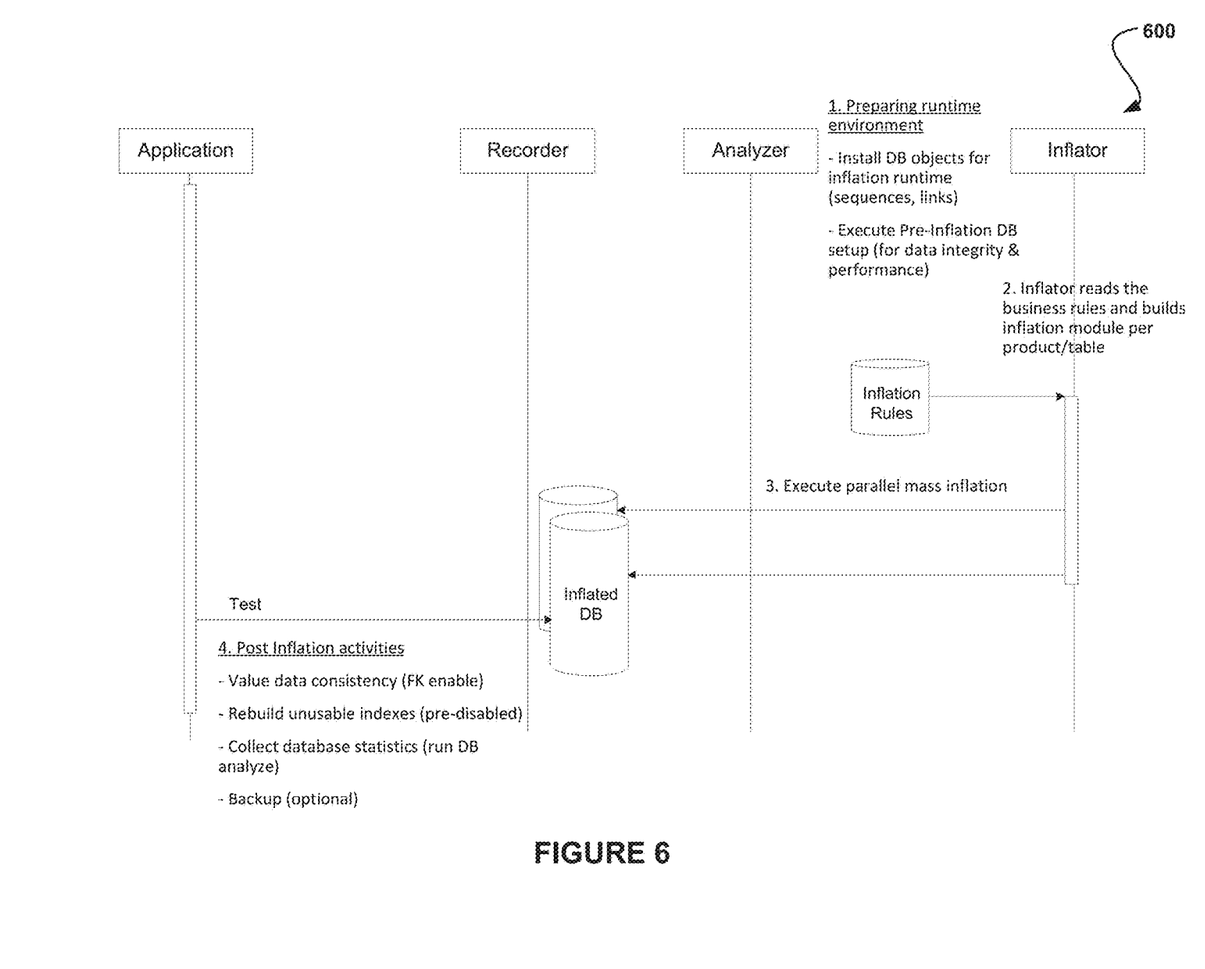
FIG. 6 illustrates a system flow diagram of an inflator component for performing smart database inflation, in accordance with one embodiment.

FIG. 6 illustrates a system flow diagram 600 of an inflator component for performing smart database inflation, in accordance with one embodiment. As an option, the diagram 600 may be viewed in the context of the details of the previous figure(s). Of course, however, the diagram 600 may be viewed in the context of any desired environment. Further, the aforementioned definitions may equally apply to the description below.

As shown, the inflator component reads the business rules and builds an inflation module per product/table. The inflator component then executes a parallel mass inflation.

With respect to preparing the runtime environment, the inflator component installs database objects for inflation runtime (e.g. sequences, links, etc.) and executes a pre-inflation database setup (e.g. for data integrity and performance, etc.).

With respect to post inflation activities, the inflator component ensues value data consistency, rebuilds unusable indexes, collects database statistics, and optionally backups the data.

The solution described herein offers the first tool and technique that is usable for a single product database and integrated systems with multiple products distributed over several databases.

Using synthetic data (e.g. random generated value), as in current systems, allows users to test applications with a large volume for some use cases, but this is inaccurate for database inflation as it does not allow working with real applications for testing and it does not reflect the real data and data integrity.

The solution described herein relies on valid data from real systems and does not have this drawback.

Using capture and replay techniques as in current systems, by instrumenting the user interface of the application, recording some scenarios from an end user, and then using automation load tools to replay those scenarios at large scale, is a valid way to inflate database with valid and real data. This however has several drawbacks, as it is complex to run and may be limited by the user interface instrumentation capabilities. It also requires the product to be in advanced development stage (often near finalization product), and any further changes in the user interface will invalidate the recording. It is also restricted by the automation tool load capabilities and the application intrinsic performances to be able to generate data at large scale, thus making it a complex, lengthy, and a slow process to generate data at large scale, and is rather inefficient for database inflation for large scale systems.

The solution described herein does not suffer from theses drawbacks. The solution does not depend on any user interface being implemented, and working at the lower data level allows the solution to be far more efficient (several orders of magnitude) than previous system implementations. Moreover, relying on basic functional readiness allows data preparation prior to the non-functional testing effort staring timelines.

Additionally, rule based data generators require very complex data processing and analysis for setting the data generation rules and most probably requires deep involvement of development teams, system architects, and performance tuning architects for the rules definition process. This can be very painful and long process, especially when the product database model contains hundreds of tables with very complex relations and even integration between different products. The recorder and analyzer modules described herein simplify that and automate almost the entire analysis process, preparing the data generation rules in a short amount of time. The involvement of the relevant experts mentioned above is not needed and the solution saves many potential problems resulted by this manual process.

Figure 7:
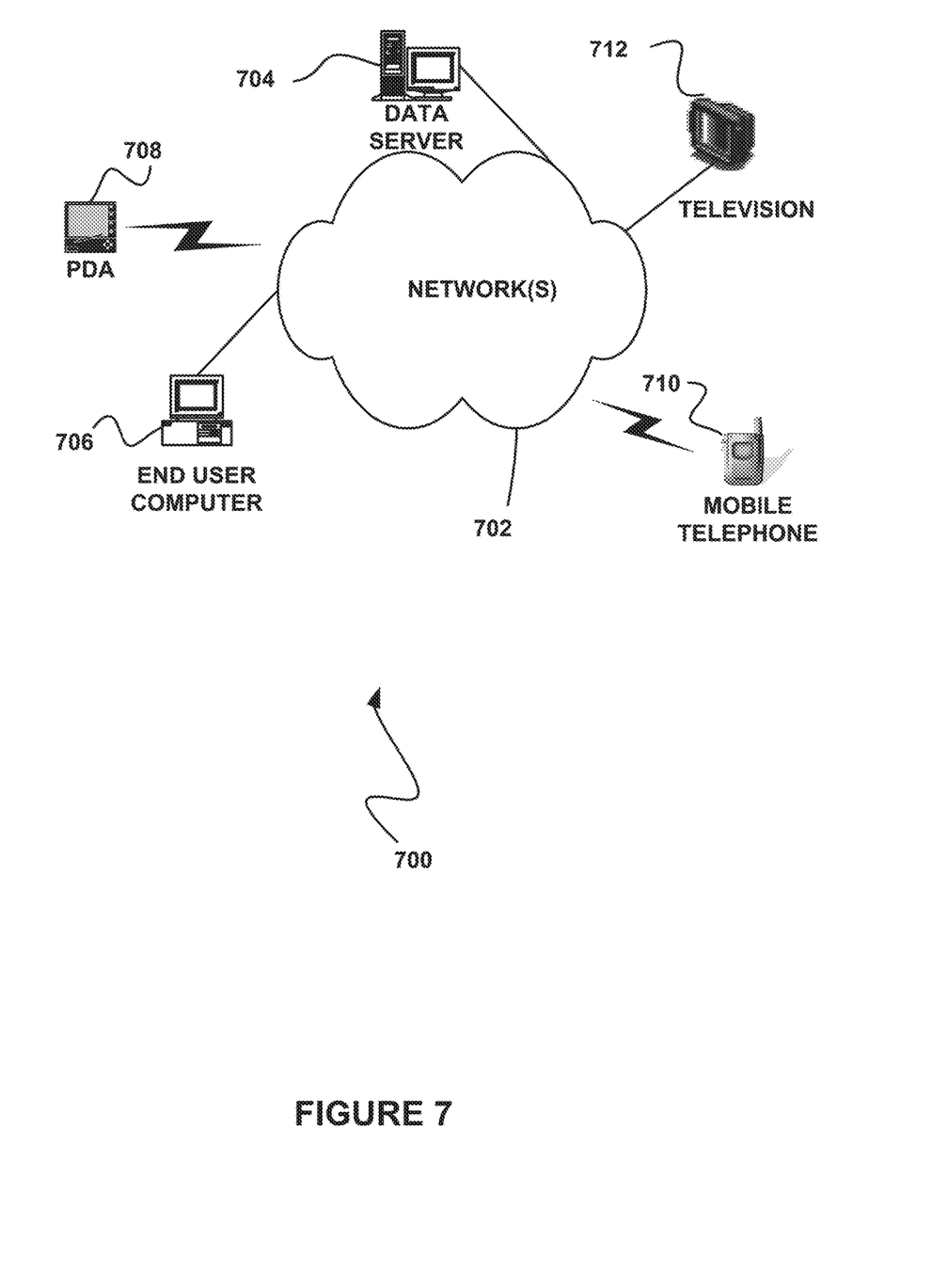
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
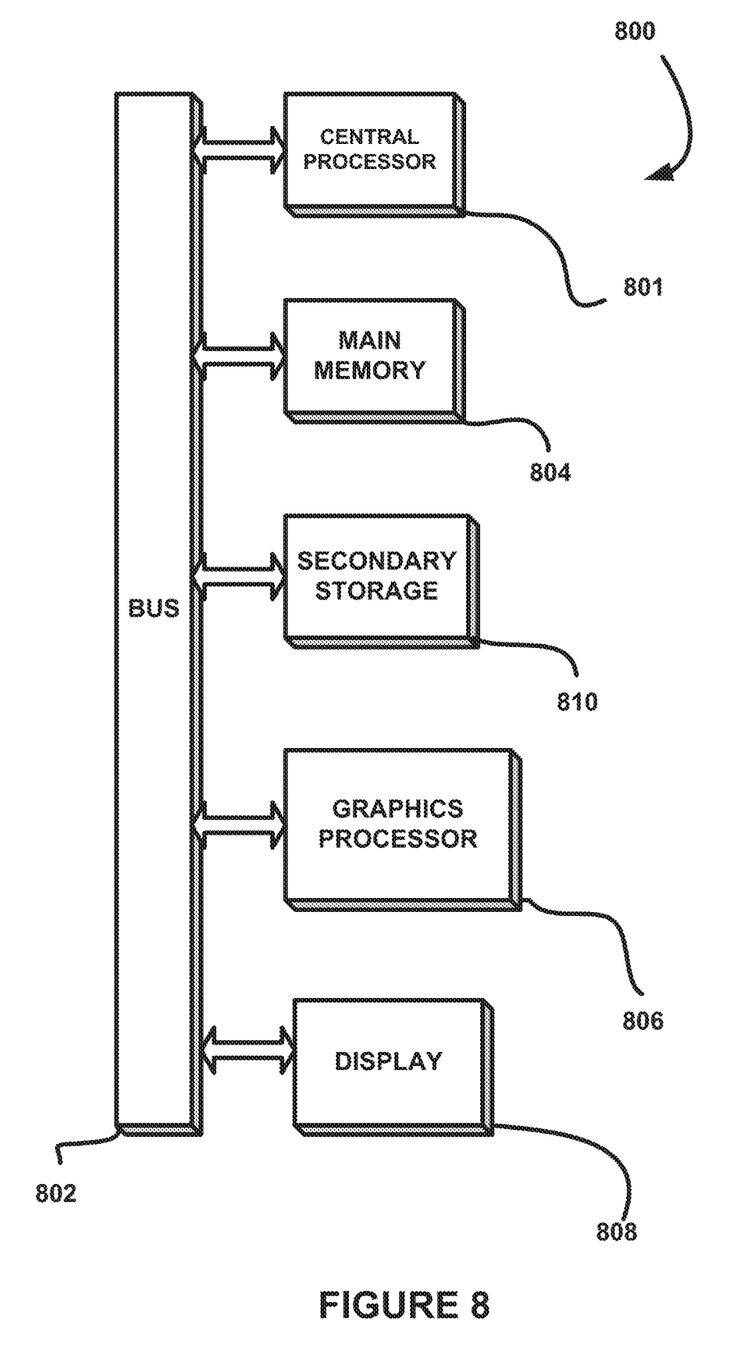
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
    detecting, by a computer system, a trigger signal to begin capturing information associated with database activities corresponding to one or more operational systems, the trigger signal being triggered by a specific business flow or transaction in the one or more operational systems;
    in response to detecting the trigger signal, capturing, by the computer system, the information associated with the database activities corresponding to the one or more operational systems for a duration of an event associated with the trigger signal, the information associated with the database activities including valid operational data and one or more affected records associated with the one or more operational systems;
    duplicating, by the computer system, the information associated with the database activities corresponding to the one or more operational systems in at least one mirroring table;
    processing, by the computer system, information associated with the database activities corresponding to the one or more operational systems to determine characteristics of the information, inflation rules that specify a configuration for one or more databases and an inflation strategy that specifies routines to use for configuring the one or more databases according to the specified configuration;
    executing, by the computer system, the inflation strategy to configure the one or more databases according to the inflation rules; and
    provisioning, by the computer system, the configured one or more databases with the valid operational data.

2. The computer program product of claim 1, further comprising computer code for configuring the at least one mirroring table prior to capturing the information associated with the database activities.

3. The computer program product of claim 1, wherein the database activities corresponding to the one or more operational systems include activities associated with an application flow corresponding to one or more software applications.

4. The computer program product of claim 1, wherein capturing the information associated with the database activities corresponding to the one or more operational systems for the duration of the event associated with the trigger signal includes capturing the information associated with the database activities for a plurality of iterations of an application flow.

5. The computer program product of claim 4, wherein the plurality of iterations of the application flow includes at least a minimum number of recommended iterations to perform the application flow.

6. The computer program product of claim 1, wherein the inflation strategy is for configuring each column in a table affected by the database activities corresponding to the one or more operational systems.

7. The computer program product of claim 1, wherein the processing of the information associated with the database activities corresponding to the one or more operational systems occurs automatically in response to a termination of the trigger signal.

8. The computer program product of claim 1, further comprising computer code for converting the inflation rules to one or more XML files.

9. The computer program product of claim 1, wherein the plurality of routines includes instructions for the executing and the provisioning of a plurality of tables associated with a tables list.

10. The computer program product of claim 9, wherein the plurality of routines include instructions corresponding to a thread amount for simultaneous execution for each of the plurality of tables associated with the tables list.

11. The computer program product of claim 9, wherein the plurality of routines include instructions corresponding to a number of logical records to insert for each of the plurality of tables associated with the tables list.

12. The computer program product of claim 9, wherein the plurality of routines include instructions corresponding to a field for each of the plurality of tables associated with the tables list.

13. The computer program product of claim 1, wherein the characteristics of the information include a type of the information and a size of the information.

14. The computer program product of claim 1, wherein the inflation rules specify tables to populate and a format of data with which to populate the tables.

15. The computer program product of claim 1, wherein the routines specified by the inflation strategy include instructions corresponding to a thread amount for simultaneous execution for each of the tables and a number of logical records to insert for each of the tables.

16. The computer program product of claim 1, further comprising:
    after provisioning the configured one or more databases with the valid operational data, using the one or more databases for software testing.

17. A method, comprising:
    detecting, by a computer system, a trigger signal to begin capturing information associated with database activities corresponding to one or more operational systems, the trigger signal being triggered by a specific business flow or transaction in the one or more operational systems;
    in response to detecting the trigger signal, capturing, by the computer system, the information associated with the database activities corresponding to the one or more operational systems for a duration of an event associated with the trigger signal, the information associated with the database activities including valid operational data and one or more affected records associated with the one or more operational systems;

duplicating, by the computer system, the information associated with the database activities corresponding to the one or more operational systems in at least one mirroring table;

processing, by the computer system, information associated with the database activities corresponding to the one or more operational systems to determine characteristics of the information, inflation rules that specify a configuration for one or more databases and an inflation strategy that specifies routines to use for configuring the one or more databases according to the specified configuration;

executing, by the computer system, the inflation strategy to configure the one or more databases according to the inflation rules; and provisioning, by the computer system, the configured one or more databases with the valid operational data.

18. A system comprising:

a memory system; and one or more processing cores coupled to the memory system and that are each configured for:

detecting a trigger signal to begin capturing information associated with database activities corresponding to one or more operational systems, the trigger signal being triggered by a specific business flow or transaction in the one or more operational systems;

in response to detecting the trigger signal, capturing the information associated with the database activities corresponding to the one or more operational systems for a duration of an event associated with the trigger signal, the information associated with the database activities including valid operational data and one or more affected records associated with the one or more operational systems;

duplicating the information associated with the database activities corresponding to the one or more operational systems in at least one mirroring table;

processing the information associated with the database activities corresponding to the one or more operational systems to determine characteristics of the information, inflation rules that specify a configuration for one or more databases and an inflation strategy that specifies routines to use for configuring the one or more databases according to the specified configuration;

executing the inflation strategy to configure the one or more databases according to the inflation rules; and provisioning the configured one or more databases with the valid operational data.

* * * * *